United States Patent [19]

Lu

[11] 4,417,651
[45] Nov. 29, 1983

[54] BALANCED FRICTION CLUTCH SYSTEM AND METHOD OF MAKING SAME

[75] Inventor: Phong Lu, Wooster, Ohio

[73] Assignee: Luk Lamellen und Kupplungsbau GmbH, Bühl, Fed. Rep. of Germany

[21] Appl. No.: 260,975

[22] Filed: May 6, 1981

[51] Int. Cl.³ .................. F16D 19/00; F16D 25/00; B21D 39/00; B23P 11/00

[52] U.S. Cl. ................................ 192/89 B; 29/520; 192/112; 301/5 B; 403/281; 403/282

[58] Field of Search ............... 29/520, 511; 403/278, 403/281, 282; 411/541, 361; 301/5 R, 5 B; 192/53 C, 70.18, 112, 89 B

[56] References Cited

U.S. PATENT DOCUMENTS

| | | | |
|---|---|---|---|
| 295,960 | 4/1884 | Van Dusen | 29/520 UX |
| 427,415 | 5/1890 | Griffin | 301/5 B UX |
| 1,620,871 | 3/1927 | Carrey | 301/5 B UX |
| 2,240,127 | 4/1941 | Binder | 192/112 X |
| 2,374,270 | 4/1945 | Brock | 29/511 UX |
| 2,419,469 | 4/1947 | Spiro | 29/511 UX |
| 2,651,488 | 9/1953 | Sauer | 29/511 UX |
| 3,213,991 | 10/1965 | Smirl et al. | 192/70.18 X |
| 3,234,989 | 2/1966 | Ruf | 301/5 R X |
| 3,450,241 | 6/1969 | Kuno | 192/70.18 |
| 3,939,951 | 2/1976 | Sink et al. | 192/70.18 X |

FOREIGN PATENT DOCUMENTS 925635  3/1955  Fed. Rep. of Germany ...... 301/5 B

*Primary Examiner*—Charlie T. Moon
*Attorney, Agent, or Firm*—Kontler, Grimes & Battersby

[57] ABSTRACT

Device for fastening a centrally recessed metal slug by slipping it over a projecting part of an assembly, including a collar or crown-like projection surrounding the central recess and extending from the slug in a direction in which the slug is to be slipped over the projecting part of the assembly, the surrounding projection being engageable with contact regions of the assembly adjacent the projecting part thereof after the slug has been slipped over the projecting part of the assembly, a region of the slug initially set back from the surrounding projection thereof being bringable over the travel path of the slug relative to the assembly, into contact with further contact regions of the assembly and, during mutual travel of the slug and the assembly, regions of the surrounding projection of the slug being shiftable radially inwardly so as to clutch and be clamped to the projecting part of the assembly.

6 Claims, 3 Drawing Figures

BALANCED FRICTION CLUTCH SYSTEM AND METHOD OF MAKING SAME

The invention relates to a device for fastening a centrally recessed metal slug, especially a balancing weight, by slipping it onto or over a projecting part of an assembly such as a friction clutch, especially.

Inasmuch as balancing friction clutches by drilling into the cover or the pressure plate thereof or by attaching balancing rivets to the outer flange of the cover is impossible, in many cases, for reasons of space or design, the aforementioned device for balancing has become developed and known heretofore. In this regard, balancing slugs of appropriate size and appropriate weight, respectively, are placed on the closing head of a rivet by which, simultaneously, the cup spring is pivotally or swingably fastened to the cover between two supports provided in circular arrangement, and this rivet head is again clinched, and the balancing slug is accordingly riveted to the cover. This method has a disadvantage, however, in that a force flux is exerted on the holding pin, whereby the mounting of the cup spring between the two circular supports can be loosened.

It is accordingly an object of the invention to provide a device and a method for balancing friction clutches wherein the foregoing disadvantage of the heretofore known devices and methods of this general type are overcome and wherein the imbalance of friction clutches can be eliminated in an efficient manner without impairing the operation of the method or the strength of the device as in the aforementioned heretofore known method or device, or in another hertofore known method and device wherein balancing weights are welded to the cover of the friction clutch. The latter method and device have a disadvantage in that the effect of heat on the friction clutch cannot be excluded whereby distortion and loss of strength, especially of the cup spring, can occur.

With the foregoing and other objects in view, there is provided, in accordance with the invention, a device for fastening a centrally recessed metal slug by slipping it over a projecting part of an assembly which includes a collar or crown-like projection surrounding the central recess and extending from the slug in a direction in which the slug is to be slipped over the projecting part of the assembly, said surrounding projection being engageable with contact regions of the assembly adjacent the projecting part thereof after the slug has been slipped over the projecting part of the assembly, a region of the slug initially set back from the surrounding projection thereof being bringable over the travel path of the slug relative to the assembly, into contact with further contact regions of the assembly and, during mutual travel of the slug and the assembly, regions of the surrounding projection of the slug being shiftable radially inwardly so as to clutch and be clamped to the projecting part of the assembly.

In accordance with another feature of the invention, the projecting part of the assembly is the head of a rivet.

Such a projecting part may, for example, be a finger-like tab bent out of the cover material of a friction clutch; in by far most of the cases, however, it will be advantageous to slip the slug on or over a previously existing element of a friction clutch, such as the head of a rivet, for example.

In accordance with a further feature of the invention, the assembly is a friction clutch having a cover and a cup spring, the slug being a balancing weight and the projecting part of the assembly being the closing head of a rivet fastening the cup spring to the cover pivotally between roll-on supports disposed in circular arrangement on both sides thereof. The closing head of a rivet joint is especially well suited for this type of fastening, because the bulging or barrel-shaped appearance thereof is surrounded by the crown or shoulder-like collar, and consequently also, proper fixing of the balancing weight against displacement in the axial direction is ensured.

In accordance with yet another feature of the invention, the projecting part of the assembly is the head of a rivet, the slug being formed with a ring-shaped recess surrounding the head of the rivet for receiving therein, during mutual travel of the slug and the assembly, the surrounding projection of the slug shifted radially on the projecting part of the assembly as well as in axial direction.

In accordance with the method of the invention, there is provided a method of balancing a friction clutch which includes slipping a centrally recessed slug-like balancing weight of metal, wherein the central recess is bounded by a collar-like shoulder projecting in direction toward a friction clutch disposed opposite further regions of the balancing weight, onto a rivet head of the friction clutch so that the projecting shoulder makes contact with regions of the friction clutch adjacent to the rivet head, and shifting the balancing weight further in direction toward the friction clutch so as to force the collar-like shoulder in radial direction of the central recess onto the rivet head and clamp it to the rivet head by reducing the diameter of the central recess.

In accordance with a more specific mode of the method, the regions of the friction clutch contacted by the projecting shoulder are on a cover of the friction clutch toward which the balancing weight is shifted farther.

Thus, the collar-like shoulder is displaced also in axial direction in the slug, advantageously into a ring-shaped or annular chamber which is provided at the regions of the slug adjacent to the crown or collar-like shoulder.

Other features which are considered as characteristic for the invention are set forth in the appended claims.

Although the invention is illustrated and described herein as embodied in device for fastening a metal slug, especially a balancing weight in an assembly, such as a friction clutch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
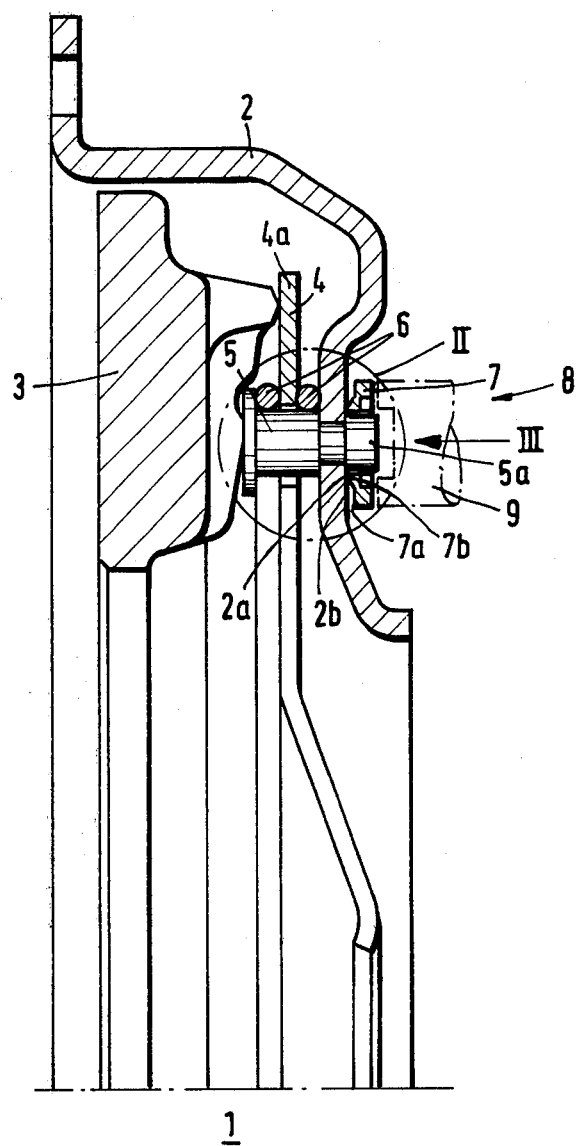
FIG. 1 is a fragmentary cross-sectional view of a friction clutch incorporating the device according to the invention.
Figure 2:
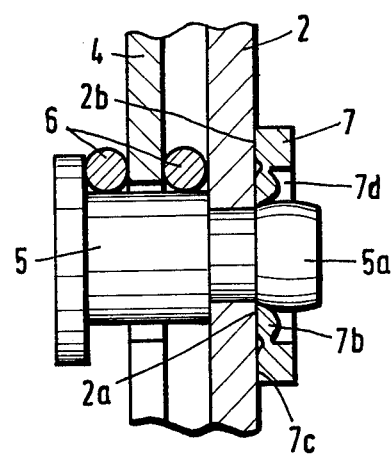
FIG. 2 is an enlarged fragmentary view of FIG. 1 showing the encircled device II.
Figure 3:
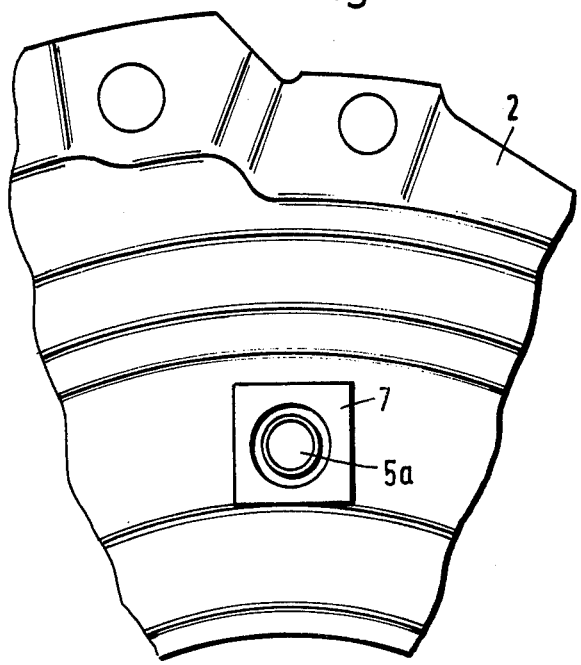
FIG. 3 is a fragmentary enlarged front elevational view of FIG. 1 as seen in direction of the arrow III.

Referring now to the figures of the drawing, there is shown a friction clutch 1 formed conventionally of a cover 2, a pressure plate 3 and a cup or plate spring (Belleville washer) 4. The cup spring 4 is fastened pivotally or tiltably to the cover 2 between two circular ring-shaped supports 6 by means of rivets 5 and loads or stresses the pressure plate 3 through the radially outer region 4a of the spring 4 in direction toward a clutch disc, not specifically shown in the figures.

To balance the friction clutch 1, one or more suitable slug-like balancing weights 7, for example, of ductile steel formed with a recess or cutout 7a are slipped onto a closing head 5a of a respective rivet or spacer pin 5 in direction of the arrow 8. The recess or cutout 7a of the slug 7 is surrounded by a collar- or ring-like extension 7b which projects from the slug 7 in the direction 8 in which the slug 7 is slipped onto the head 5a. With this collar or shoulder 7b thereof, the slug 7 is disposed in the position shown in FIG. 1, against regions 2a of the cover 2 adjacent to the closing head 5a. If the slug 7 is forced farther in direction toward the cover 2, which can be effected by means of a punch 9, regions 7c of the slug 7 make contact with additional regions 2b of the cover 2, the ring, collar or shoulder 7b becoming deformed radially inwardly toward and onto the closing head 5a and becoming further admitted into or accommodated within a circular recess 7d formed in the slug 7. The slug 7 consequently clutches or is jammed on the closing head 5a, the fact that the closing head 5a has a bulging or barrel-like shape being advantageous in this regard. Trouble-free fixation of the balancing weight 7 against displacement in axial direction of the clutch is thereby assured.

As mentioned hereinbefore, the invention is not limited to the embodiment illustrated in the drawing but, rather, the slug 7 can also be fastened to other parts, such as to other rivets, for example, like those which serve conventionally for connecting the cover to the pressure plate by means of leaf springs, or also to other elements such as to a tab bent out of the cover material and the device according to the invention and the method according to the invention, respectively, can also be used in other assemblies.

There are claimed:

1. Method of balancing a friction clutch which comprises slipping a centrally recessed slug-like balancing weight of metal, wherein the central recess is bounded by a collar-like shoulder projecting in direction toward a friction clutch disposed opposite further regions of the balancing weight, onto a rivet head of the friction clutch so that the projecting shoulder makes contact with regions of the friction clutch adjacent to the rivet head, and shifting the balancing weight farther in direction toward the friction clutch so as to force the collar-like shoulder in radial direction of the central recess onto the rivet head and clamp it to the rivet head by reducing the diameter of the central recess.

2. Method according to claim 1 wherein the regions of the friction clutch contacted by the projecting shoulder are on a cover of the friction clutch toward which the balancing weight is shifted farther.

3. A balanced friction clutch system, said system including a friction clutch having a portion projecting therefrom; and a slug-like metal balancing weight having a central recess which is slipped over the projecting portion of said clutch, said weight including a collar-like shoulder surrounding the central recess and extending from the weight in a direction in which the weight is to be slipped over the projecting portion of the clutch, said shoulder being engageable with contact regions of the clutch adjacent the projecting portion thereof after the weight has been slipped over the projecting portion of the clutch, a region of said weight initially set back from said shoulder thereof being bringable over the travel path of said weight relative to the clutch and into contact with further contact regions of the clutch and, during mutual travel of said weight and said clutch, regions of the collar of said weight being shifted radially inwardly so as to force the shoulder in the radial direction of the central recess onto the projecting portion and clamp it onto the projecting portion by reducing the diameter of the central recess.

4. System according to claim 3 wherein the projecting portion of the clutch is the head of a rivet.

5. System according to claim 3 wherein the friction clutch has a cover and a cup spring and the projecting portion thereof is the closing head of a rivet which is adapted to pivotally fasten the cup spring to the cover between roll-on supports disposed in circular arrangement on both sides thereof.

6. System according to claim 3 wherein the projecting portion of the clutch is the head of a rivet, wherein said weight has a ring-shaped recess surrounding the head of said rivet for receiving therein and, wherein during mutual travel of the weight and the clutch, the shoulder of said weight is shifted radially and axially on the projecting portion of the clutch.

* * * * *